J. G. C. MANTLE.
VARIABLE SPEED TRANSMISSION MECHANISM.
APPLICATION FILED JUNE 19, 1915.

1,319,160.

Patented Oct. 21, 1919.
5 SHEETS—SHEET 5.

INVENTOR
Joseph G. C. Mantle
BY
Bennie, Davis + Marvin
ATTORNEYS

UNITED STATES PATENT OFFICE.

JOSEPH G. C. MANTLE, OF NEW YORK, N. Y., ASSIGNOR TO MANTLE & COMPANY, OF NEW YORK, N. Y., A CORPORATION OF NEW YORK.

VARIABLE-SPEED-TRANSMISSION MECHANISM.

1,319,160.  Specification of Letters Patent.  Patented Oct. 21, 1919.

Application filed June 19, 1915. Serial No. 35,009.

*To all whom it may concern:*

Be it known that I, JOSEPH G. C. MANTLE, a citizen of the United States, residing at and whose post-office address is No. 1907 Park avenue, city, county, and State of New York, have invented certain new and useful Improvements in Variable-Speed-Transmission Mechanism; and I do hereby declare the following to be a full, clear, and exact description of the invention, such as will enable others skilled in the art to which it appertains to make and use the same.

This invention relates to an improvement in transmission mechanism of the type in which a driven pulley on a line shaft, machine or the like, is adapted to be rotated at different speeds from a constant speed driving pulley on a line shaft or the like by means of a device which may be termed a speed variator and which comprises a receiving pulley or its equivalent, a delivery pulley or its equivalent and means for varying the relative peripheral speeds of the receiving and delivery pulleys. The receiving pulley is usually connected by a belt to the driving pulley while the delivery pulley is connected to the driven pulley by a belt or any other suitable driving means. In order to avoid needless repetition, subsequent reference to receiving and delivery pulleys will be understood to include all equivalents thereof.

Heretofore, speed variators have been so constructed that the tension of the driving belt will be maintained constant for all speeds of the driven pulley. As the speed of the driving belt is constant it is evident that the tension of the belt must be sufficient to transmit the maximum horse power to the driven pulley when the latter is being rotated at its highest speed. In view of the fact that the friction between the journals and their bearings is proportional to the belt tension it follows that there will be a loss of power whenever the speed variator transmits less than the maximum horse power which it is designed to transmit. One of the objects of this invention is to overcome this objectionable feature by providing means for automatically increasing or decreasing the tension of the driving belt as the speed of the driven pulley increases or decreases.

While the invention is applicable to speed variators of any type as regards the automatic tensioning of the driving belt, in other features it relates more particularly to a speed variator comprising an expansion pulley, adapted to be driven by the driving belt, and means to expand and contract the expansion pulley. In still other features, the invention relates specifically to speed variators having two expansion pulleys and means for expanding either one of the pulleys and simultaneously contracting the other one. One of the expansion pulleys is driven by the driving belt and the other expansion pulley is connected to the driven pulley by any suitable driving means. In the earlier forms of this type of speed variators the expansion pulleys were not belted or otherwise directly connected to the driving and driven pulleys, but formed an intermediate mechanism operatively connected to constant diameter receiving and delivery pulleys which in turn were belted or otherwise directly connected to the driving and driven pulleys. The expansion pulleys were belted to one another and means were provided for expanding and contracting the pulleys whereby the relative speeds of the receiving and delivery pulleys were varied. A speed variator of this type is adapted for general application as it can be connected to a driving pulley on a line shaft and to a driven pulley upon a line shaft or upon a machine wherever located with respect to the driving line shaft. The objections to speed variators of this type are that they are not compact, that they contain a greater number of parts, and are not economical owing to the amount of friction. These objections were overcome by placing the expansion pulleys side by side upon a common swinging axis, and belting them directly to the driving and driven pulleys, whereby the expansion pulleys became the receiving and delivery pulleys. The relative peripheral speeds of the receiving and delivery pulleys will, of course, vary with their expansion and contraction. This latter form of speed variators, however, had the disadvantage that it was not adapted for general application as it could only be employed when the driving pulley, variator, and driven pulley were in line. If the driven pulley was on a machine located upon the floor and not underneath the line shaft it was, therefore, necessary to employ idlers or some form of angle drive which not only increased the number of parts but also increased the friction. One of the objects of this invention is to provide a speed variator of the latter form, above referred to, but which is adapted for general application irrespective of the relative positions of the driving and driven pulleys, whereby the use of idlers or an angle drive is avoided.

One serious objection to speed variators comprising one or more expansion pulleys is that an objectionable amount of noise is produced while they are being operated. This noise is due to two causes. In the first place, it is caused by the belt as it successively comes into contact with the segments of the pulley rim, being, of course, more pronounced when the pulley is rotating at the higher speeds and expanded to a diameter such that the segments are separated from one another to an appreciable extent. This objection is overcome in the present invention by so forming the segments that the belt does not come into contact therewith throughout its width at one and the same time, but that it will gradually come into contact with each successive segment along lines which are oblique with respect to the direction of travel of the belt. The noise due to this cause is further lessened by providing a rim and ribs on the under surfaces of the segments.

Another cause of the noise is the fact that during each revolution of the expansion pulley, the segments are subjected for a portion of the time to the pressure of the belt tending to force them inward, while during the remaining portion of the time they are relieved of this pressure and are acted upon only by centrifugal force which tends to move them outward. This tendency for the segments to move inwardly and outwardly during each revolution of the pulley not only produces noise but also causes rapid wear between the segment carrying member and the mechanism for moving the same inwardly and outwardly relatively to the hub of the pulley. These objectionable features are overcome in the device constructed in accordance with this invention, by applying a spring pressure to the segment-carrying members, which acts in a direction at right angles to the direction of movement of the member. The pressure of the spring need be only sufficient to overcome the centrifugal force during the brief interval of time in which the belt pressure is not acting on the segment. By means of these springs, therefore, the segments are prevented from moving outwardly and the resulting noise and wear are obviated.

In the later type of speed variators above referred to, in which the expansion pulleys are mounted upon a common axis, the expansion and contraction of the rims is effected by means of a hollow, rotatable pinion passing through the centers of the pulleys and engaging teeth formed on the segment carrying members, the pinion being rotated by a longitudinally movable shaft passing therethrough and having a helical groove coacting with a helical thread formed on the pinion. When the pulleys are of the same diameter the centrifugal forces are in balance with respect to the pinion and the shaft. When, however, one pulley is expanded and the other one is contracted, the centrifugal forces become unbalanced with the result that the expanding and contracting mechanism is subjected to excessive wear and friction and an undesirable heating of the various parts results. The increased friction also renders it difficult to operate the expanding and contracting mechanism. The unbalance of the centrifugal forces does not materially affect the operation of the speed variator during the first part of the expansion of either pulley from its mean position, but as either one of the pulleys approaches its maximum diameter the above mentioned objectionable features become very pronounced. According to this invention, these objections are overcome by means of springs which act upon the pinion and tend to overcome the centrifugal force at the time when its effect is the most pronounced which is during the latter part of the expansion of either one or the other of the pulleys.

Other objects of the invention are to provide a speed variator which may be readily and quickly installed in position for use, and in which the expansion and contraction mechanism is so constructed as to overcome many objectionable features which are present in the mechanisms hitherto employed.

In the accompanying drawings, which illustrate several modifications of the invention.

Referring to Figs. 1 to 11 of the drawings, 22 represents a casting which is bolted or otherwise secured to the ceiling and which is provided with depending brackets 23 and 24 carrying bearings 25 in which a shaft 26 is journaled. Secured to the outer ends of the shaft are sprocket wheels 27 and 28 which are preferably spaced from the brackets by collars 29. The shaft 26 is rotated by a manually actuated chain 27' which engages the sprocket wheel 27. The bearings 25 extend inwardly and form supports for the U-shaped swinging frame which comprises a horizontal cross bar or connecting member 30 of substantially hollow circular section and depending arms 31 and 32. By forming the brackets 23 and 24 as a part of the supporting casting, it will be seen that the bearings 25 are always in alinement with one another irrespective of the position of the casting, thereby saving the time and labor which is necessary in the alining of bearings which are independent of one another. The arms 31 and 32 are provided at their lower ends with suitable journal boxes 33 and 34 within which the axis of the expansion pulleys is journaled.

The expansion pulleys, either one of which may be the receiving pulley and the other of which is the delivery pulley, are mounted side by side and rotate about a common axis. They are provided with built-up hubs comprising a plurality of intermediate plates 35 and end plates 36 all of which are held in assembled position by means of bolts 37, each of which is provided with a collar 37' adjacent one of its ends which engages one of the outer end plates. The end plates are preferably of a diameter slightly greater than the diameter of the pulleys when expanded to their maximum extent. In order to save weight and to decrease the number of parts, there is but one inner end plate which is common to both pulleys, as clearly shown in Fig. 1. Engaging the outer end plates 36 and held in position by the bolts 37 are flanges 38 and 39 of the hollow journals 40 and 41 which extend within the journal boxes 33 and 34, and form the axis of the pulleys. The journal 41 is provided at its outer end with an outwardly extending flange 42 which engages the outer wall of the journal box 34 for a purpose hereinafter described.

The plates of the built-up hubs are provided with pairs of recesses 43 arranged in staggered relation, the recesses of each pair being parallel with one another and positioned upon opposite sides of registering central openings formed in the plates. Slidably positioned within the recesses 43 are rim-segment carrying-members 44 provided with teeth 44' which engage a rotatable pinion 45 which extends through and is supported in the central openings in the hubs of the plates. Endwise movement of the pinion is prevented by washers 46 supported by the journals 40 and 41. When the pinion is rotated, as hereinafter described, the segment carrying-members will be moved outwardly or inwardly, depending upon the direction of rotation of the pinion, the pulleys being mounted right and left handed so that when the members of either of the pulleys are moved outward, the members of the other pulley will be moved inward and vice versa.

Figures 4, 5, 6, 7, 8, 9, 10, 11:
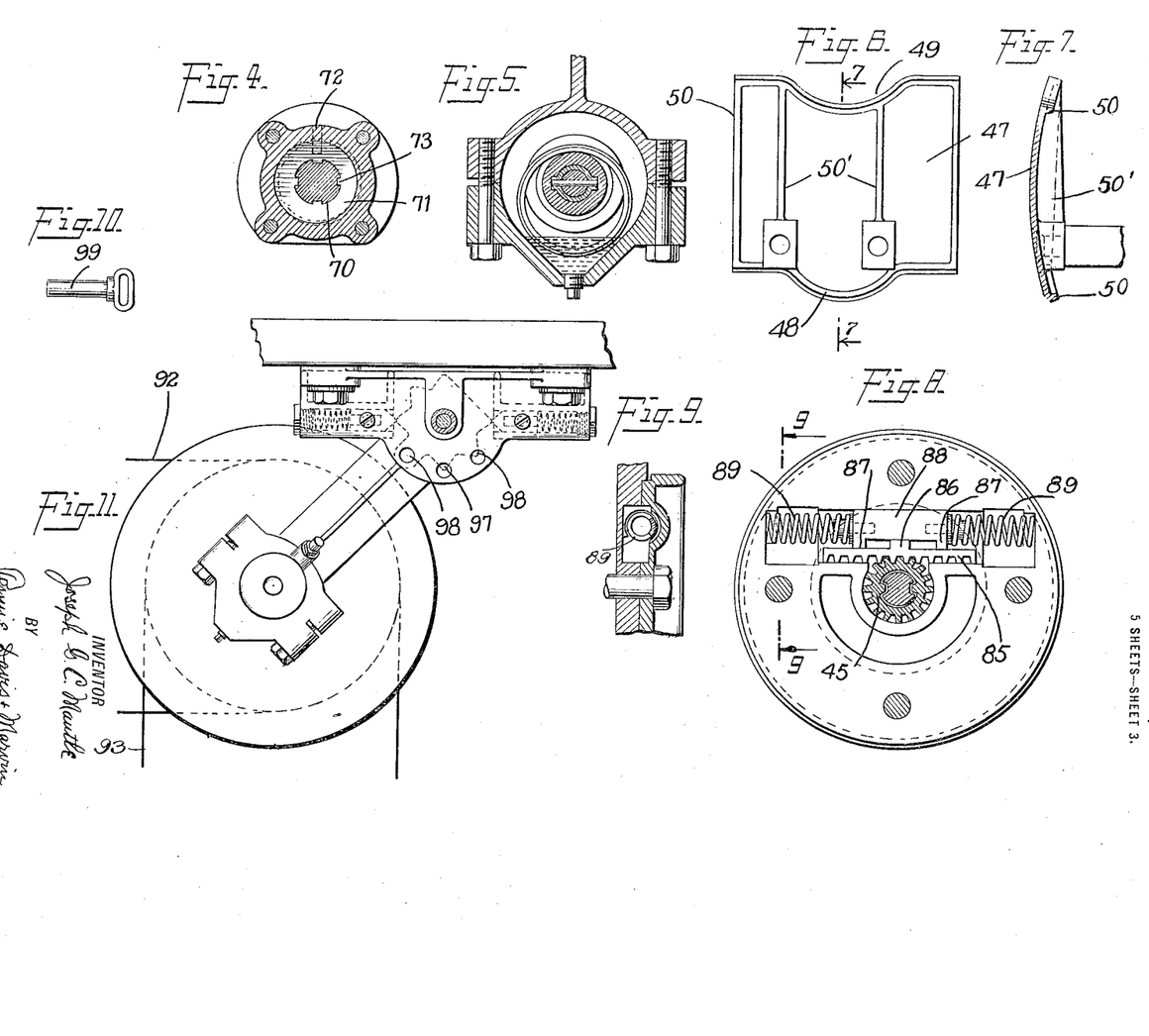
Fig. 4 is a sectional view taken on the line 4—4 of Fig. 1.
Fig. 5 is a sectional view taken on the line 5—5 of Fig. 1.
Fig. 6 is a bottom plan view of one of the rim segments.
Fig. 7 is a sectional view taken on the line 7—7 of Fig. 6 and showing in elevation a part of one of the segment carrying members.
Fig. 8 is a sectional view taken on the line 8—8 of Fig. 1.
Fig. 9 is a detail sectional view taken on the line 9—9 of Fig. 8.
Fig. 10 is an elevational view of the key which is employed when the belts are being placed in position and adjusted.
Fig. 11 is a view similar to Fig. 2 showing the normal position of the parts when driving from a line shaft to a pulley on a machine which is located on the floor but not underneath the line shaft.
Figure 12:
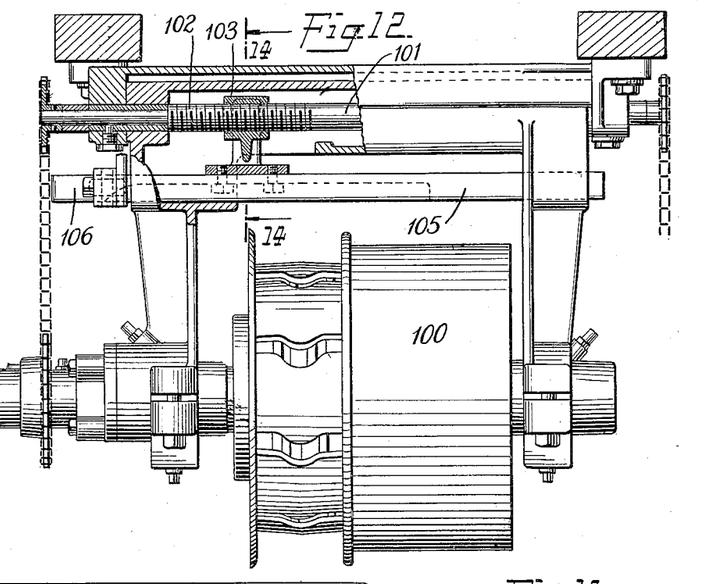
Fig. 12 is a view in side elevation of a modified form of the device adapted for driving a fast and loose pulley on a machine located on the floor but not underneath the line shaft, parts being broken away for the sake of clearness.
Figures 13, 14, 15:
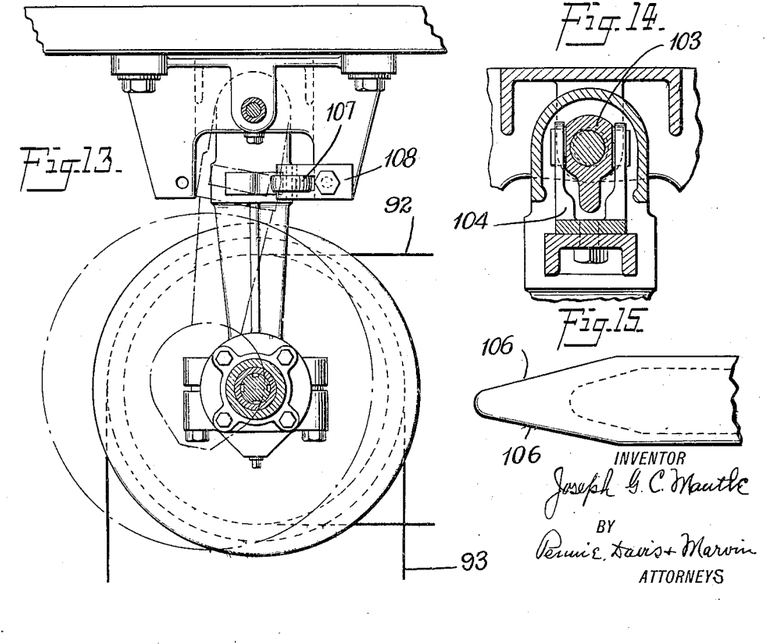
Fig. 13 is a view in end elevation thereof, parts being shown in section.
Fig. 14 is a sectional view taken on the line 14—14 of Fig. 12.
Fig. 15 is a detail view of the cam member.

Each of the rim-segments 47 which are secured to the outer ends of the members 44, is provided, as shown in Fig. 6, with a curved portion 48 projecting outwardly from one of its transverse edges and with a correspondingly shaped recess 49 extending inwardly from its other transverse edge. When the pulley is contracted to its smallest diameter, the portion 48 of each segment will be within the recess 49 of the adjacent segment to form a continuous rim. The purpose of so shaping the belt engaging surface of the segments is to lessen the noise caused by the belt successively engaging the segments when the pulley is expanded. This noise is due to a slapping action of the belt on the forward edge of the segment and after careful experiments I have found that this noise can be eliminated by providing the curved projection 48 and the curved recess 49 of relatively short radius at the central portion of the edges of the segment. The segments so shaped fit together, when the pulley is contracted, to form a substantially true cylindrical surface. The length of the projection 48, in a circumferential direction, is not sufficient to cause the surface of the projection to depart to any substantial extent from the true circumferential line of the pulley at any position of expansion or contraction, and yet its shape and position cause it to break the slapping action of the belt and prevent the undesirable noise. The noise is further prevented by forming a rim 50 and ribs 50' on the under surface of each segment, which rim and ribs at the same time increase the strength of the segment without materially increasing its weight. Each segment, both on the belt surface and the opposite surface, is curved in a transverse direction as well as in the direction of rotation of the pulley.

Figure 3:
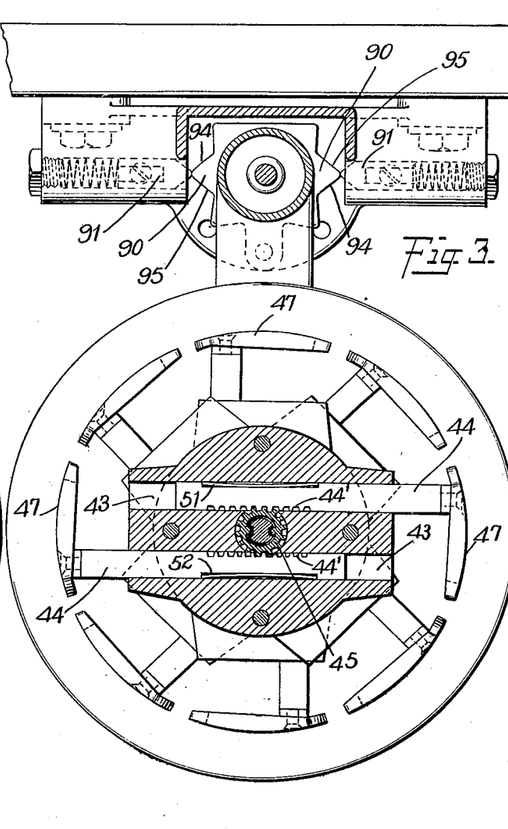
Fig. 3 is a sectional view taken on the line 3—3 of Fig. 1.

In order to prevent the members 44 and the segments 47 carried thereby from being moved outwardly by the action of centrifugal force during that portion of the revolution of the pulley when the segments are not engaged by the belt, springs 51 are provided. As shown in Fig. 3, these springs are positioned in longitudinally extending recesses 52 formed in the members 44 opposite to the teeth 44' and exert a pressure which acts at right angles to the direction of their movement. The pressure of the springs need be only great enough to create sufficient friction between the members 44 and the inner walls of the recesses 43 in which they are positioned to overcome the centrifugal force during the brief interval of time in which it acts uncounteractedly during each revolution of the pulley. As the members 44 will, therefore, be held against movement while the pulley is rotating, there will be no unnecessary wear between the parts 43, 44, 44' and 45 and all noise heretofore caused by movement of the members will be avoided.

Rotary movement of the pinion 45 is effected by means of a longitudinally movable shaft 53 which is provided with helical grooves 54 which receive correspondingly shaped threads 55 formed in the central bore of the pinion. In order to reduce the friction to a minimum and to prevent the shaft 53 from acting as a support for the pinion 45, the diameter of the shaft is less than that of the bore of the pinion, and the depth and the width of the grooves 54 is such that they will be engaged by the side faces only of the threads 55, as clearly shown in Fig. 3. At one of its ends, the shaft 53 is supported by an enlargement 56 which fits within the hollow journal 40 and which is provided with projections 57 engaging guideways 58 formed in the journal. This construction permits longitudinal movement of the shaft but prevents rotary movement thereof relatively to the journal or to the pulleys. Adjacent to its other end, the shaft 53 is supported by means of a portion reduced in diameter and forming a neck 59 which is journaled between the flanges 60 of a split sleeve 61 which fits within the hollow journal 41. The sides of the flanges 60 are in engagement with a headed portion 62 of the shaft 53 and with the shoulder 63 from which it will be seen that as the split sleeve is moved to and fro in the direction of the length of the journal, it will impart a longitudinal movement to the shaft. The longitudinal movement of the shaft will impart a rotary movement to the pinion 45 which, in turn, will cause either one of the pulleys to expand and the other pulley to contract, depending upon the direction of rotation of the pinion.

The means for imparting a to and fro movement to the split sleeve 61 will now be described. Bolted or otherwise secured to the arm 32 of the swinging frame is an annular member 64 within which a sleeve 65 is rotatably supported. A sprocket wheel 66 having its hub 67 secured to the sleeve 65 is connected to the sprocket wheel 28 by a chain 68. The sprocket wheel 66 and sleeve 65 may be considered as forming a nut which is rotated when the sprocket wheel 28 is rotated.

As the swinging frame oscillates about the axis of rotation of the sprocket wheel 28, the distance between the centers of this sprocket wheel and the sprocket wheel 66 will be constant for all positions of the frame and therefore there will be no variation in the tension of the chain 68. A cap 69 is threaded upon the outer end of the sleeve 65 to exclude dust therefrom and to serve as a limiting stop to the movement of the expanding and contracting mechanism as hereinafter described. The bore of the sleeve 65 adjacent its inner end is of reduced diameter, and is provided with a thread engaging the thread of a longitudinally movable screw 70, the axis of which is in alinement with the axis of the shaft 53. Rotary movement of the screw is prevented by means of a ring 71 threaded within the annular member 64, and held in position by a pin 72. The ring 71, see Fig. 4, is provided with projections 73 engaging grooves 74 extending lengthwise of the screw 70. The sleeve 65 is held against longitudinal movement by a flange 75 formed on its inner end and engaging the ring 71 and a shoulder 76 formed on the annular member 64. At its inner end the screw 70 is provided with a shank 77 extending within the split sleeve and carrying a head 78. Mounted upon the shank and engaging the head 78 and the body of the screw are washers 79 and 80 between the oppositely disposed faces of which balls are interposed. The washers 79 and 80 engage, respectively, with shoulders 81 and flanges 82 formed on the split sleeve in order that longitudinal movement of the screw will produce a corresponding movement of the split sleeve and of the shaft 52. At its outer end, the screw 70 is provided with an enlarged head 83 which limits the outward and inward movement of the screw by engaging the cap 69 or the shoulder 84 which is formed by the reduced portion of the bore of the sleeve. By thus providing stops for positively limiting the travel of the screw in either direction, there is no danger of the various parts becoming jammed.

The above described arrangement of the screw 70 and the shaft 53 and the means for operatively connecting them to one another permits of these members being thrown more or less out of alinement with one another due to the wearing of the parts without materially affecting their operation. It is also pointed out that the entire thrust due to the longitudinal movement of the shaft 53 in either direction is taken up by the arm 32 of the swinging frame. When the shaft is moved to the right, as viewed in Fig. 1, the thrust is taken up by the flange 42 of the journal 41, which engages the outer end of the journal box 34, and when the shaft is moved to the left, the thrust is taken up by the flange 39 of the journal which engages the inner end of the journal box 34. This construction eliminates the tendency of the arms of the swinging frame to be sprung apart which is the case when the thrust acts upon both arms.

In order to overcome the hereinbefore referred to objectionable features which result from the unbalance of the centrifugal forces as one pulley expands and the other contracts, the following described means is provided. Reciprocatingly mounted within registering recesses formed in the flange 38 and the adjacent end plate 36 is a rack 85 which meshes with the pinion 45, as clearly shown in Fig. 8. This rack is provided with a projection 86 adapted to engage one or the other of the lugs 87 of the slidable member 88 after the rack has traveled through a predetermined distance. The member 88 is held in its normal or central position by means of compression springs 89 positioned within the recesses and acting upon the member 88 at its opposite ends. When the expansion pulleys are of the same diameter, the projection 86 on the rack will occupy a position midway between the lugs 87 on the member 88 which will occupy its normal position, as shown in Fig. 8. As one of the pulleys is expanded, and the other contracted by the rotation of the pinion 45, the rack will be moved to the right or left, depending upon the direction of rotation of the pinion. As the injurious results due to this unbalance of the centrifugal forces do not materially affect the operation until the difference between the diameters of the pulleys reaches a predetermined point, the travel of the rack is unimpeded. When, however, this predetermined difference in the diameter of the pulleys is reached, the projection 86 will have come into engagement with one of the lugs 87. If, now, the pulley of larger diameter be further expanded, the member 88 will be caused to move to the right or left, thereby compressing one or the other of the springs 89. This compression of the spring, of course, increases as the distance through which the member 88 moves increases, and therefore, its tendency to expand to return the member 88 to its normal position also increases. The expansive force of the spring acts to overcome the injurious effects due to the unbalanced centrifugal forces as it tends to rotate the pinion in the opposite direction to that in which the unbalanced centrifugal forces tend to rotate it. The result is that the wear and friction between the various parts of the expanding and contracting mechanism is greatly lessened and injurious heating of the parts is avoided. Furthermore, the resistance to the longitudinal movement of the shaft 53 will remain substantially constant at all times.

Figure 1:
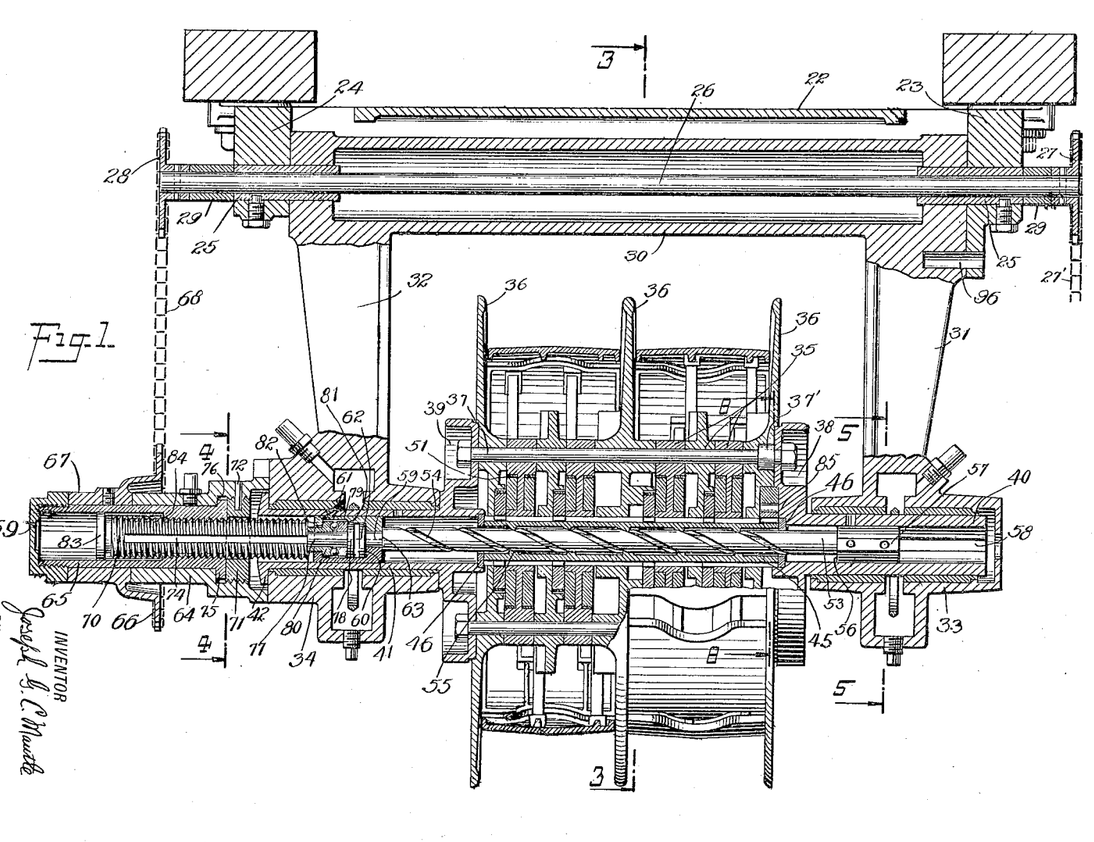
Figure 1 is a sectional view of one form of the speed variator taken on the line 1—1 of Fig. 2 showing the normal position of the parts when the driving and driven parts are in line.

The pulleys are assembled by threading the plates 35 and 36 upon the bolts 37 with the outer end plate shown at the right of Fig. 1 engaging the collars 37' on the bolts. A mandrel is inserted through the central openings of the plates to hold them in their proper positions. After the plates are thus arranged the hub 41 is placed in position upon the bolts with its flange 39 engaging the outer end plate shown at the left of Fig. 1, and the parts are clamped in position by means of nuts which engage the threaded ends of the bolts. The mandrel is then withdrawn and the pinion 45 is inserted in place thereof after which the rack 85 and its associated parts are placed in position. The hub 40 is then mounted upon the bolts 37 and clamped in position by nuts threaded upon the bolts.

Figure 2:
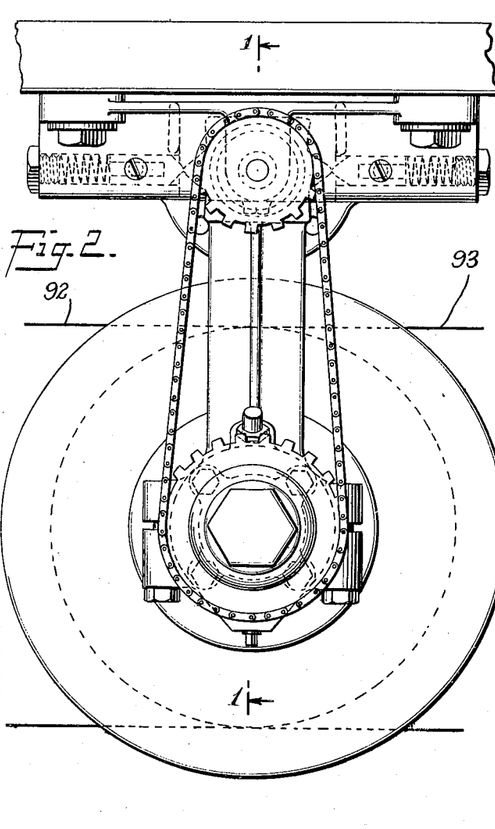
Fig. 2 is a view in end elevation as seen from the left of Fig. 1.

The means for automatically increasing or decreasing the tension of the driving belt as the speed of the driven pulley increases or decreases, will now be described. The cross bar 30 of the swinging frame is provided adjacent each of its ends with laterally extending cams 90 which are engaged by opposite acting spring pressed plungers 91 mounted in suitable recesses in the casting 22. Referring to Fig. 2, in which the driving and driven belts are in line, let it be assumed that 92 is the driving belt and 93 the driven belt. Under normal conditions, in which the expanding pulleys are of the same diameter, the swinging frame will be in its center position with the arms vertical. The plungers 91 will be in engagement with the highest points of the cams 90 and will not tend to swing the frame in either direction. If it is desired to increase the speed of the driven pulley, it is necessary to expand the delivery expansion pulley with which the driven belt 93 coacts, and at the same time the receiving expansion pulley with which the driving belt 92 coacts will be contracted. As the length of the driven belt remains constant, the expansion of the delivery pulley will cause the swinging frame to move to the right as seen in Figs. 2 and 3. When this occurs, the plungers 91 will engage the surfaces 94 of the cams 90, thereby swinging the frame beyond the point to which it would swing under the action of the belt 93 alone. The additional distance through which the frame is swung by the plungers 91 increases the tension of the driving belt. At the same time the expansion of the delivery pulley has increased the angle of its circumferential gripping-surface and compensated for the lessened tension in its belt.

If it is desired to decrease the speed of the driven pulley below its normal speed, the receiving expansion pulley is expanded. As a result of this, the frame will be swung to the left and the plungers 91 will engage the cam surfaces 95, thereby swinging the frame beyond the point to which it would swing under the action of the belt 92 alone. The result produced by this additional swinging movement of the frame is the reverse of that above described, that is to say, the tension of the driving belt is decreased.

Referring to Fig. 11, the speed variator is shown in position for a right angle drive, the driven belt 93 being belted to a pulley on a machine located on the floor. In this arrangement, the swinging frame normally occupies a position in which the arms form an angle of forty five degrees with the vertical. The plungers normally engage the edges of the cross bar 30 and the edges of the adjacent sides of the cross bar form arms corresponding to the cams 90. The tension of the driving belt is automatically increased or decreased as the speed of the driven pulley increases or decreases in a manner similar to that above described.

Figure 16:
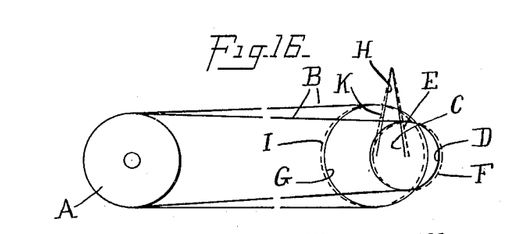
Figs. 16 and 17 are diagrammatic views illustrating the principles of the invention as regards the belt tensioning feature.
Figure 17:
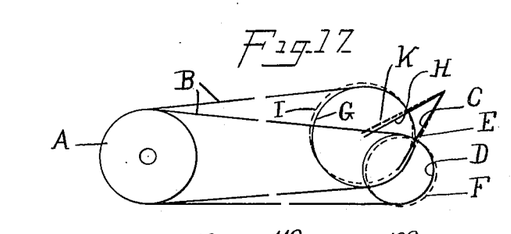

The automatic tensioning of the driving belt is diagrammatically represented in Figs. 16 and 17, Fig. 16 illustrating the positions of the receiving pulley when the driving and driven belts are in line, and Fig. 17 illustrating the position of such pulley when the belts are at right angles to one another. In each figure A represents the driving pulley and B the driving belt. C and D indicate respectively the positions which the arms of the swinging frame and the receiving pulley will assume upon contraction of the pulley if no automatic tensioning means is employed. E and F indicate the positions assumed by these members due to the action of the tensioning means and it will be seen that when in this position the tension of the driving belt is increased. If the receiving pulley is expanded, it will, in the absence of automatic tensioning means, assume a position indicated by G and the arms of the frame will assume a position indicated by H. If automatic tensioning means is employed, these members will assume the positions indicated by I and K respectively and it will be seen that the tension of the driving belt is decreased.

In order to hold the swinging frame in its normal position while the belts are being placed in position and adjusted as to their length, one arm of the frame is provided with a recess 96 adapted to register with either one of a plurality of holes 97, 98 formed in the bracket 23. The centers of these holes are equidistant from and concentric with the axis of rotation of the shaft 26. The center of the hole 97 is below and in a vertical line with the axis of rotation of the shaft, while the holes 98, which are positioned at opposite sides of the hole 97, are spaced therefrom by an angle of a little over forty five degrees from the vertical. When the recess 96 is in registry with either one of the holes, the frame may be locked in position by the insertion of a key 99, shown in Fig. 10.

If the speed variator is to be employed in connection with driving and driven belts which are in the same line, the frame is positioned with the recess 96 registering with the hole 97, and the key 99 is then inserted thereby locking the frame against movement. The belts may then be placed in position and adjusted to their correct lengths after which the key is withdrawn. In a similar manner, the belts may be positioned and adjusted for a right angle drive, as shown in Fig. 11. In this case, it is necessary to first swing the frame until the recess 96 registers with one or the other of the holes 98 and then insert the key 99, thereby holding the frame in position with its arms extending at an angle of about forty five degrees with the vertical. In each instance, of course, the receiving and delivery pulleys should be of the same diameter, while the belts are being positioned and adjusted.

Referring to Figs. 12 to 15, there is shown a modified form of the apparatus which is particularly applicable to a right angle drive from a line pulley to a fast and loose pulley on a machine located upon the floor and not underneath the line pulley. In this modification, the receiving pulley is an expansion pulley constructed and expanded and contracted as above described. The delivery pulley 100, however, is of the solid rim type, in order to permit lateral movement of the driven belt thereon as it is shifted from the fast pulley to the loose pulley or vice versa. Normally, the arms of the swinging frame are vertical and the belts are properly adjusted while the frame is in this position. While the automatic belt tensioning means above described could be employed in this modified form of the speed variator, there is shown other means for accomplishing the result. The manually actuated shaft 101 is provided with a threaded portion 102 which engages the thread of a traveling nut 103. The nut is held against rotation within a bracket 104, which is secured to a cam member 105 slidingly supported by the arms of the swinging frame. At one of its ends, the member 105 is provided with cam surfaces 106 with either one of which a roller 107, carried by a bracket 108, is adapted to engage. The bracket 108 is detachably mounted upon the casting which supports the swinging frame and is positioned to the right or left of the cam member 105, depending upon whether the driving belt 92 extends to the right or left. When the shaft 101 is rotated, for the purpose of contracting the receiving pulley so as to increase the speed of the driven pulley, the cam member will be moved to the left as viewed in Fig. 12, thus causing the swinging frame to move to the left, as viewed in Fig. 13. The cam surface 106 is so formed that during this swinging movement of the frame, the tension of the driving belt will be increased. When the receiving pulley is expanded, the cam member and frame will move in the opposite direction to that described and the tension of the driving belt will be correspondingly decreased. As the frame swings from its normal position, the center of the axis of rotation of the receiving and delivery pulleys will, of course, be raised, but the distance through which it is raised will be so slight, that there will be no appreciable tightening of the driven belt 93.

Figure 18:
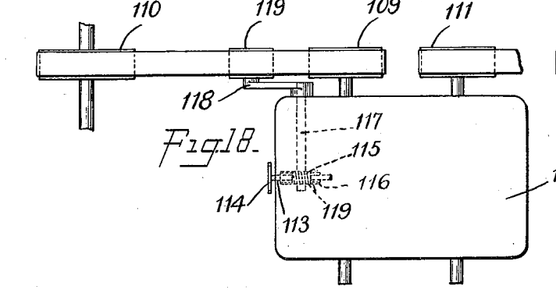
Figs. 18 and 19 are diagrammatic views illustrating a modified means for tensioning the belt.
Figure 19:
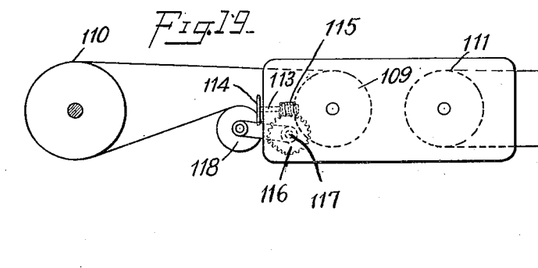

In Figs. 18 and 19, there is shown a modified construction for automatically tensioning the driving belt. The speed variator is provided with a receiver pulley 109 which is belted to the driving pulley 110 and a delivery pulley 111 which is belted or otherwise connected to the driven pulley, not shown. The mechanism for varying the relative speeds of the receiving and delivery pulleys, which may be of any type, is indicated diagrammatically by 112 and is operated by a shaft 113 adapted to be rotated by a chain or a hand wheel 114. The shaft is provided with a worm 115 engaging a worm gear 116 mounted upon one end of a rocking shaft 117. An arm 118 is secured to the other end of the rocking shaft and carries a pulley 119 engaging the driving belt. As the shaft 113 is rotated, to cause the operation of the speed variator to increase or decrease the speed of the driven pulley, the pulley 119 will be moved in a direction to increase or decrease the tension of the driving belt.

Figure 20:
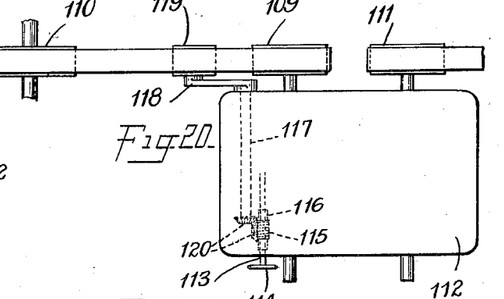
Figs. 20 and 21 are similar views illustrating another modified construction for accomplishing this result.
Figure 21:
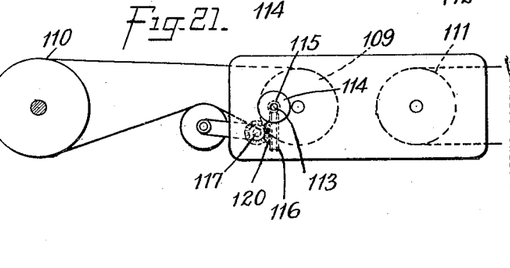

A similar construction is shown in Figs. 20 and 21, but in this instance, wherein the operating shaft 113 carrying the wheel 114 is at right angles to the plane of the receiving pulley, one of a pair of miter gears 120, is connected to the worm gear 116 and the other to the shaft 117 on which is mounted the arm 118 carrying the pulley 119. Of course, any other suitable mechanism could be used for connecting in the required ratio, the movement of the operating member or wheel 114 with a member 118 carrying the pulley 119, the form and arrangement of this connection depending on the relative positions of the receiving pulley 109 and the operating member or wheel 114.

Having thus described the invention, what I claim is:

1. In transmission mechanism, a driving pulley, a driven pulley, a speed variator belted to the driving pulley and operatively connected to the driven pulley to vary the speed thereof, and automatically operated means to increase the tension of the driving belt as the speed of the driven pulley increases.

2. In transmission mechanism, a driving pulley, a driven pulley, a receiving pulley belted to the driving pulley, a delivery pulley operatively connected to the receiving pulley and to the driven pulley, means to vary the relative speeds of the receiving and delivery pulleys, and automatically operated means to increase or decrease the tension of the driving belt as the speed of the delivery pulley increases or decreases.

3. In transmission mechanism, an expansion pulley adapted to be driven by a driving belt, means to expand and contract said pulley, a delivery pulley operatively connected to said expansion pulley to be driven at different speeds thereby in accordance with the expansion and contraction thereof, and means controlled by the expansion and contracting means to increase or decrease the tension of the driving belt as the diameter of the expansion pulley decreases or increases.

4. In transmission mechanism, a receiving expansion pulley adapted to be driven by a driving belt, a delivery expansion pulley operatively connected to the receiving pulley, means to expand either one of the pulleys and simultaneously contract the other one, and automatically operated means to increase or decrease the tension of the driving belt as the diameter of the delivery pulley increases or decreases.

5. In transmission mechanism, a speed variator comprising a receiving pulley and a delivery pulley operatively connected together and having means to expand one of the pulleys and contract the other one simultaneously, belt connections to said pulley, and automatically actuated means to decrease the tension of the belt on the pulley which is expanded and increase the tension of the belt on the pulley which is contracted.

6. In transmission mechanism, a frame, expansion receiving and delivery pulleys rotatably supported thereby and adapted to be engaged by driving and driven belts, respectively, means to expand and contract the pulleys, said frame being mounted to swing as the pulleys expand and contract, and automatically operated means to accentuate the swinging movement of the frame.

7. In transmission mechanism, a frame, expansion receiving and delivery pulleys rotatably supported thereby and adapted to be engaged by driving and driven belts, respectively, means to expand and contract the pulleys, said frame being mounted to swing as the pulleys expand and contract, cams carried by the frame, and spring pressed plungers engaging the cams to accentuate the swinging movement of the frame.

8. A speed variator comprising a swinging frame carrying a receiving pulley and a delivery pulley and mechanism for simultaneously expanding one and contracting the other of said pulleys independently of the swinging movement of the frame, in combination with a support for the frame provided with mechanism for temporarily securing it in a central vertical position or in either one of two positions at an angle of approximately 45° on either side of the central position, to permit the adjustment of the driving belts with the pulleys in their mean position of expansion and the subsequent release of the frame to permit it to assume various positions as the diameters of the pulleys are varied.

9. A speed variator comprising a swinging frame carrying a receiving pulley and a delivery pulley and mechanism for simultaneously expanding one and contracting the other of said pulleys independently of the swinging movement of the frame, in combination with a support for the frame provided with mechanism for temporarily securing it in a vertical position to permit the adjustment of the driving belts with the pulleys in their mean position of expansion and the subsequent release of the frame to permit it to assume various positions as the diameters of the pulleys are varied.

10. A speed variator comprising a swinging frame carrying a receiving pulley and a delivery pulley and mechanism for simultaneously expanding one and contracting the other of said pulleys independently of the swinging movement of the frame, in combination with a support for the frame provided with mechanism for temporarily securing it at an angle of approximately 45° from the vertical to permit the adjustment of right angle driving belts on the pulleys with the pulleys in their mean position of expansion and the subsequent release of the frame to permit it to assume various positions as the diameters of the pulleys are varied.

11. In transmission mechanism, a support, a frame swingingly supported thereby, receiving and delivery pulleys carried by said frame, one of the pulleys being an expansion pulley, means to expand and contract the expansion pulley, a shaft journaled in the supports, the axis of rotation of the shaft coinciding with the axis of oscillation of the frame, means to rotate the shaft, and a driving connection between the shaft and the expanding and contracting means.

12. In transmission mechanism, a support, a frame swingingly supported thereby, receiving and delivery pulleys carried by said frame, one of the pulleys being an expansion pulley, means to expand and contract the expansion pulley, a shaft journaled in the supports, the axis of rotation of the shaft coinciding with the axis of oscillation of the frame, means at one end of the shaft to rotate the same, and a driving connection between the other end of the shaft and the expanding and contracting means.

13. In transmission mechanism, a support, bearings supported thereby, a frame mounted to swing upon the bearings, receiving and delivery pulleys carried by the frame, one of the pulleys being an expansion pulley, means to expand and contract the expansion pulley, a shaft journaled in said bearings, means to rotate the shaft, and a driving connection between the shaft and the expanding and contracting means.

14. An expansion pulley comprising a plurality of rim segments each having at one edge straight side portions and a central circumferentially projecting curved portion of short radius, and at its other edge corresponding straight side portions and a central curved recess of short radius, whereby the segments form a substantially true cylindrical surface when the pulley is contracted, but prevent slapping noise of the belt when the segments are separated by the expansion of the pulley.

15. In transmission mechanism, a frame, an expansion pulley carried thereby and comprising a plurality of rim segments, the inner and outer surfaces of each of said segments being curved transversely and also in the direction of rotation of the pulley, whereby each segment will be light and strong, each of said rim segments being provided with strengthening means on its inner surface, and means to expand and contract the pulley.

16. In transmission mechanism, a frame, a pulley hub carried thereby having recesses formed therein, members slidingly positioned within said recesses, rim segments carried by the members at their outer ends, means to move the members inwardly and outwardly relatively to the hub embodying interlocking parts, and means acting at right angles to the direction of movement of the members to resist movement of said members by centrifugal force when the rim segments are out of engagement with the belt and thereby prevent pounding of said interlocking parts.

17. In transmission mechanism, a frame, a pulley hub carried thereby having recesses formed therein, members slidingly positioned within said recesses, rim segments carried by the members at their outer ends, means to move the members inwardly and outwardly relatively to the hub embodying interlocking parts, and springs positioned within the hub and engaging the members, said springs acting at right angles to the direction of movement of the members to resist movement of said members by centrifugal force when the rim segments are out of engagement with the belt and thereby prevent pounding of said interlocking parts.

18. In transmission mechanism, a frame, a pulley hub carried thereby and having a central opening extending therethrough, a hollow pinion extending through said opening and provided with internal threads, sliding members carried by the hub and having teeth engaging the pinion, a longitudinally movable shaft extending through the hollow pinion and having grooves with which the internal threads of the pinion coact, said shaft being supported independently of said pinion to have a working clearance within the bore of the pinion, and means for moving the shaft in a longitudinal direction.

19. In transmission mechanism, a frame, a pulley hub carried thereby and having a central opening extending therethrough, a hollow pinion extending through said opening and provided with internal threads, sliding members carried by the hub and having teeth engaging the pinion, a longitudinally movable shaft extending through the hollow pinion and having grooves with which the internal threads of the pinion coact, the shaft having a working clearance within the bore of the pinion and the side faces only of the threads engaging the grooves, and means for moving the shaft in a longitudinal direction.

20. An expansion pulley comprising a central rotatable pinion, rim segment carrying members having teeth engaging the pinion so that the members are moved in and out by the rotation of the pinion, a longitudinally movable shaft carrying a screw engaging the interior of the pinion to rotate it upon longitudinal movement of the shaft, a longitudinally movable screw operatively connected to impart longitudinal movement to the shaft, means to move the screw to and fro in the direction of its length, and stops to limit the movement thereof in both directions within the limits of movement of the rim segment carrying members, whereby jamming is prevented.

21. An expansion pulley comprising a central rotatable pinion, rim segment carrying members having teeth engaging the pinion so that the members are moved in and out by the rotation of the pinion, a longitudinally movable shaft carrying a screw engaging the interior of the pinion to rotate it upon longitudinal movement of the shaft, a longitudinally movable screw operatively connected to impart longitudinal movement to the shaft, a rotatable threaded nut engaging the screw, and means to rotate the nut, the screw and nut being provided with coacting means to limit the movement of the screw in both directions within the limits of movement of the rim segment carrying members, whereby jamming is prevented.

22. In transmission mechanism, a frame, an expansion pulley carried thereby, pulley expanding and contracting means comprising a longitudinally movable shaft, a longitudinally movable screw operatively connected to the shaft whereby movement of the screw will move the shaft, a rotatable threaded nut engaging the screw, and means to rotate the nut, said screw being provided with a head at its outer end, said nut being provided with an interior shoulder adapted to be engaged by the head of the screw to limit the movement of the screw in one direction and with a cap at its outer end adapted to be engaged by the head of the screw to limit the movement thereof in the other direction.

23. In transmission mechanism, a frame provided with bearings, an expansion pulley supported by hollow journals engaging said bearings, pulley expanding and contracting means comprising a longitudinally movable shaft having its ends supported and completely housed within the hollow journals, and screw means for imparting a longitudinal movement to the shaft.

24. In transmission mechanism, a frame provided with bearings, an expansion pulley supported by hollow journals engaging said bearings, pulley expanding and contracting means comprising a longitudinally movable shaft having its ends supported and completely housed within the hollow journals, a screw in substantial alinement with the shaft and operatively connected to one end thereof, and means for imparting a longitudinal movement to the screw.

25. In transmission mechanism, a frame provided with bearings, an expansion pulley supported by hollow journals engaging said bearings, pulley expanding and contracting means comprising a longitudinally movable shaft, a sleeve slidingly mounted in one of the hollow journals and forming a support for one end of the shaft, the other end of the shaft being supported in the other hollow journal, a screw provided with sleeve engaging means, and means for imparting a longitudinal movement to the screw.

26. In transmission mechanism, a frame comprising a pair of arms provided with journal boxes, an expansion pulley supported by hollow journals mounted within the journal boxes, and pulley expanding and contracting means comprising a longitudinally movable shaft and means to impart to and fro movement thereto, one of the journals being provided with flanges coacting with the ends of its associated journal box whereby the thrust due to the movement of the shaft in either direction will be taken up by one only of the arms.

27. An expansion pulley comprising a rotatable central pinion and radially movable rim segment carrying members having teeth engaging said pinion to be moved to and fro thereby, in combination with means for counterbalancing the centrifugal pull of said members on the pinion when the pulley is expanded.

28. In transmission mechanism, a frame, a pair of expansion pulleys carried thereby, means to expand either one of said pulleys and simultaneously contract the other one, said means comprising a rotatable central pinion and radially movable rim segment carrying members having teeth engaging said pinion to be moved to and fro thereby, in combination with means for counterbalancing the unbalanced centrifugal pull of the said members on the pinion when the pulleys are of different diameters.

29. In transmission mechanism, a frame, a pair of expansion pulleys carried thereby, means to expand either one of the pulleys and simultaneously contract the other one, said means comprising a rotatable pinion and sliding rim-segment-carrying members having teeth engaging said pinion, a rack engaging the pinion and adapted to be moved to and fro thereby, and spring pressed means adapted to be engaged by the rack after it has moved a predetermined distance in either direction.

30. In transmission mechanism, a frame, a pair of expansion pulleys carried thereby, means to expand either one of the pulleys and simultaneously contract the other one, said means comprising a rotatable pinion and sliding rim-segment-carrying members having teeth engaging the pinion, a rack engaging the pinion and adapted to be moved to and fro thereby, a slidable member adapted to be engaged by the rack after it has moved a predetermined distance in either direction, and oppositely disposed compression springs engaging the ends of the slidable member, whereby one or the other of the springs will be compressed when the rack is moved beyond the predetermined distance.

31. In transmission mechanism, a pair of expansion pulleys comprising outer and inner end plates and intermediate plates and bolts extending through said plates to maintain them in their assembled positions, each of said bolts being provided with a collar adjacent one of its ends and engaging one of the outer end plates.

In testimony whereof I affix my signature.

JOSEPH G. C. MANTLE.